(12) United States Patent
Hjelm (10) Patent No.: US 9,084,475 B2
(45) Date of Patent: Jul. 21, 2015

(54) HEIGHT ADJUSTABLE PIECE OF FURNITURE WITH ZERO STAND-BY POWER CONSUMPTION

(71) Applicant: KIH-utveckling AB, Jönköping (SE)

(72) Inventor: Kaj Hjelm, Jonkoping (SE)

(73) Assignee: KIH-UTVECKLING AB, Jonkoping (SE)

( * ) Notice: Subject to any disclaimer, the term of this patent is extended or adjusted under 35 U.S.C. 154(b) by 186 days.

(21) Appl. No.: 13/760,687

(22) Filed: Feb. 6, 2013

(65) Prior Publication Data

US 2013/0199419 A1      Aug. 8, 2013

(30) Foreign Application Priority Data

Feb. 7, 2012   (EP) ..................... 12154162

(51) Int. Cl.
- *H02P 1/00* (2006.01)
- *A47B 9/00* (2006.01)
- *H02P 1/02* (2006.01)
- *H02J 3/00* (2006.01)

(52) U.S. Cl.
CPC . *A47B 9/00* (2013.01); *H02J 3/005* (2013.01); *H02P 1/02* (2013.01)

(58) Field of Classification Search
USPC .................. 318/687, 135; 361/160
See application file for complete search history.

(56) References Cited

U.S. PATENT DOCUMENTS

| | | | |
|---|---|---|---|
| 5,528,449 A * | 6/1996 | Koch | 361/160 |
| 5,752,448 A | 5/1998 | Eyre | |
| 6,286,441 B1 * | 9/2001 | Burdi et al. | 108/147 |
| 6,595,144 B1 | 7/2003 | Doyle | |
| 6,690,132 B2 * | 2/2004 | Koch | 318/445 |
| 2005/0283911 A1 * | 12/2005 | Roussy | 5/611 |
| 2007/0072487 A1 * | 3/2007 | Gorman | 439/535 |
| 2009/0185403 A1 * | 7/2009 | Koch | 363/126 |

FOREIGN PATENT DOCUMENTS

| | | | |
|---|---|---|---|
| WO | WO-2010054656 A1 | 5/2010 | |
| WO | WO-2011134612 A2 | 11/2011 | |

OTHER PUBLICATIONS

Technische Dokumentation Bedienungsanleitung, Feb. 7, 2007, Ophelis Pfalzmöbel, XP002679772.
Tony R. Kuphaldt, Lessons in Electric Circuits, Mar. 1, 2002, XP002679773, vol. IV.

* cited by examiner

*Primary Examiner* — Rina Duda
*Assistant Examiner* — Bickey Dhakal
(74) *Attorney, Agent, or Firm* — Harness, Dickey & Pierce, P.L.C.

(57) ABSTRACT

The present invention relates to a height adjustable piece of furniture comprising at least one extendable column, an electric motor adapted for driving the extendable column, at least one switch for operation control of the electric motor, and a power control unit adapted to control the power distribution to the height adjustable piece of furniture, and wherein the power control unit is connected to a power source. The connection between the power source and the height adjustable piece of furniture is provided via the switch, and the switch is in an activated state adapted to connect the power source to the height adjustable piece of furniture, and in a deactivated state adapted to disconnect the power source from the height adjustable piece of furniture. The present invention further relates to a power control unit for control of power distribution to a height adjustable piece of furniture.

11 Claims, 5 Drawing Sheets

HEIGHT ADJUSTABLE PIECE OF FURNITURE WITH ZERO STAND-BY POWER CONSUMPTION

CROSS REFERENCE TO RELATED APPLICATIONS

This application claims priority to European Application Number 12154162.7 filed Feb. 7, 2013, the entire contents of each of which are hereby incorporated herein by reference.

TECHNICAL FIELD

The present disclosure relates to a height adjustable piece of furniture, and especially to power supply control of a height adjustable piece of furniture.

BACKGROUND

Present height adjustable piece of furniture that is driven by an electric motor is usually powered via a mains power supply. When the electric motor is operated it consumes the power supplied to the piece of furniture. A height adjustable piece of furniture is rather seldom operated. The piece of furniture may typically be operated a few times a day. Most of the time the piece of furniture is not in use and operation circuits in the piece of furniture is in a stand-by mode.

In the stand-by mode the piece of furniture still consumes power due to detection circuits adapted to detect operation of an operation button for activating the electric motor. A plurality of solutions has been disclosed trying to alleviate the drawback of stand-by power consumption by minimizing the stand-by power of the piece of furniture. For instance in WO11134612 A2, which discloses a control circuit for adjustable piece of furniture wherein the connection to the mains power supply is disconnected in a stand-by mode. However, there is still power consumption in the piece of furniture in the stand-by mode due to a detection circuit. Also a very small amount of power consumption during stand-by mode accumulates to large power consumption over time, due to the fact that the piece of furniture is connected to the power supply constantly.

One way of reducing the power consumption from the mains power supply during a stand-by mode is disclosed in WO10054656 A1. A height adjustable piece of furniture is disclosed comprising a solar panel and an energy storage unit. In the stand-by mode, the mains power supply is disconnected and the power needed by the detection circuit is provided by the energy storage, which has been charged by the solar panel. The piece of furniture may thereby be completely disconnected from the mains power supply during stand-by mode. When a button is activated for operation of the electric motor, the piece of furniture is connected to the mains power supply for powering the electric motor. Hence, there is still a need for power in the stand-by mode, but which power is provided off-mains. A solar panel is an expensive and complex solution to the problem of needing mains power supply in stand-by mode. Further it does not solve the problem of needed power level during stand-by mode.

Consequently, there is a need for a solution of powering a height adjustable piece of furniture, which provides further less power needs during a stand-by mode in order to reduce power consumption.

SUMMARY

It is an object of the present invention to provide an improved solution that alleviates the mentioned drawbacks with present devices. Furthermore, it is an object to provide a piece of furniture arrangement that enables an effective power consumption control of power consuming devices in connection to the arrangement.

According to a first aspect of the invention this is achieved by a height adjustable piece of furniture comprising at least one extendable column, an electric motor adapted for driving the extendable column, at least one switch for operation control of the electric motor, and a power control unit adapted to control the power distribution to the height adjustable piece of furniture, and wherein the power control unit is connected to a power source. The connection between the power source and the height adjustable piece of furniture is provided via the switch, and the switch is in an activated state adapted to connect the power source to the height adjustable piece of furniture, and in a deactivated state adapted to disconnect the power source from the height adjustable piece of furniture.

The piece of furniture comprises a switch which may be used for controlling the operation of the electric motor. The switch may thereby be operated when the piece of furniture is to be raised or lowered, i.e. when the extendable column is to be extended or contracted. By providing the power supply to the piece of furniture via the switch, the power supply may be completely disconnected when the switch is not operated, i.e. when the piece of furniture is in a stand-by mode. Since there is no connection to the power source in the stand-by mode, the stand-by power consumption may be eliminated.

The height adjustable piece of furniture may be a table, bed, stand, desk, shelf or the like.

In one embodiment the switch may comprise an operation switch and a relay in direct electrical connection with the operation switch. The connection between the power source and the height adjustable piece of furniture may be provided via the relay, and the operation switch may in an activated state be adapted to put the relay in an activated state.

The switch may comprise an operation switch, such as a button or the like, and a relay. The operation switch may be provided in an operation unit in the piece of furniture easy accessible for a user of the piece of furniture. The relay may be provided in the power control unit, which may be arranged out of easy range for the user. The operation switch in direct electrical connection with the relay may put the relay in an activated state when activated. The operation switch may be activated by being pressed or pushed or the like. The relay may be directly connected to the power source, and may provide the only power supply to the piece of furniture. In the activated state, the relay may activate power supply to the piece of furniture, i.e. connect the power source to the piece of furniture. In a deactivated state, the relay may disconnect the connection between the power source and the piece of furniture. When the operation switch is in a deactivated state, it may force the relay to be in a deactivated state.

In a further embodiment, the power supply to the electric motor may be connected via the relay when the relay is in the activated state.

The operation switch may be activated when a user wants to raise or lower the piece of furniture, i.e. operate the electric motor. When the operation switch is activated, the relay may be activated. Due to the power supply connection to the electric motor via the relay, the power supply to the electric motor may be disconnected when the relay is in a deactivated state.

In another embodiment, the switch may comprise two operation switches comprising a first operation switch for operating the electric motor to expand the extendable column, and a second operation switch for operating the electric motor to contract the extendable column. The switch may further comprise two relays comprising a first and a second relay, each in direct electrical connection with an operation switch respectively.

The switch for operating the height adjustment of the piece of furniture may comprise two operation switches and two relays. The operation of the electric motor may thereby be controlled by the operation switches via the relays which supply power to the electric motor. The electric motor may be adapted to operate in different direction depending on which operation switch is operated. The first operation switch may be in direct electrical contact with the first relay, and the second operation switch may be in direct electrical contact with the second relay.

In a further embodiment, the first relay may be prevented from being in the activated state when the second relay is in the activated state.

When an operation switch is activated, the corresponding relay may activate power supply to the electric motor. Each of the two operation switches may be activated for a specific operation control of the electric motor. Such control may be an operation direction of the electric motor. The first and the second operation switch may thereby not be activated simultaneously. To prevent the possibility of activating the operation commands for both operation switches simultaneously, the relays may be prevented from being activated simultaneously. When the first operation switch is activated, it may be adapted to both activate the first relay, and at the same time deactivate the second relay.

In one embodiment, the height adjustable piece of furniture may further comprise a control unit in connection with the electric motor, wherein the control unit may be powered when the switch is in the activated state, and wherein the control unit may receive a motor operation signal from the switch when the switch is in the activated state.

The control unit may be connected to the power supply from the switch. Besides the supply of power when being in the activated state, the switch may supply a motor operation signal. The motor operation signal may comprise information regarding an operation state of the electric motor. Such operation state may be which direction the electric motor may operate. The switch may comprise two operation switches and two relays. Each of the operation switches may be operated to control the operation of the electric motor. The direction in which the electric motor may be operated may depend on which of the two operation switches that is activated. Since the electric motor is powered via the switch the electric motor may only be operated when one of the two operation switches is in the activated state. The power to the electric motor may be provided via a relay. The electric motor may be powered in the same way regardless which operation switch that is activated. The motor operation signal may however be selected based on which operation switch that is activated. The control unit may then combine the supplied power with the motor operation signal to operate the electric motor in a desired way.

In one embodiment, the switch may comprise at least one operation switch arranged on a slideable carrier on the piece of furniture, wherein the slideable carrier in an activated state may be adapted to connect the power source to the height adjustable piece of furniture, and in a deactivated state may be adapted to disconnect the power source from the height adjustable piece of furniture.

Thereby, a physical interaction from the user, by setting the slideable carrier in the activated state, may enable power to the piece of furniture.

In a further embodiment, the slideable carrier may comprise a power switch for connection or disconnection of the power source to the height adjustable furniture, wherein slideable carrier in a first slide position may be in the activated state wherein the power switch is adapted to connect the power source to the height adjustable furniture, and wherein the slideable carrier in a second slide position may be in the deactivated state wherein the power switch is adapted to disconnected the power source from the height adjustable furniture.

The piece of furniture may for instance be a table. The slideable carrier may thereby be arranged at an under surface of a table top of the table. The carrier may thereby be slided from a first position to a second position, which may represent an activated position and a deactivated position. The power switch in the carrier may be arranged such that it is activated, i.e. connects the power source to the piece of furniture, when the carrier is in the activated position. The user may slide the carrier to the first position to activate the power to the piece of furniture, and may thereafter operate the electric motor. When the user has operated the electric motor in the piece of furniture, he/she may move the carrier back to the second position, breaking the power supply to the piece of furniture. In one embodiment, the slideable carrier may comprise spring means, adapted to hold the carrier in the second position as a rest position. The rest position may thereby be a stand-by position which disconnects the power supply to the piece of furniture. The power switch may be a circuit breaker.

According to a second aspect of the invention, a power control unit for a height adjustable piece of furniture comprising at least one adjustable column is provided, wherein the power control unit is adapted to be connected to a power source, an electric motor of the height adjustable piece of furniture for driving the adjustable column, and at least one operation switch adapted for control of the operation of the electric motor. The power control unit comprises a relay adapted for direct electrical connection with an operation switch, and the operation switch is adapted to, when activated, activate the relay. The relay is in an activated state adapted to provide a connection between the power source and the height adjustable piece of furniture, and in a deactivated state adapted to disconnect the power source from the height adjustable piece of furniture.

An operation switch connected to the power control unit may be used for controlling the operation of an electric motor in the piece of furniture to which the power control unit is connected. The operation switch may thereby be operated when the piece of furniture is to be raised or lowered. By providing the power supply to the piece of furniture via the relay in the power supply unit, the power supply to the piece of furniture may be completely disconnected when the relay is not in the activated state, i.e. when the piece of furniture is in a stand-by mode. Since there is no connection between the power source and the piece of furniture in the stand-by mode, the stand-by power consumption may be eliminated.

A power control unit according to the present invention may be installed in an existing height adjustable piece of furniture between an operation switch and an electric motor.

The height adjustable piece of furniture may be a table, bed, stand, desk, shelf or the like.

In one embodiment, the power control unit may be adapted to be connected to a first and a second operation switch for control of operation of an electric motor, and the power control unit may comprise a first and a second relay, each in direct electrical connection with an operation switch respectively.

The piece of furniture may comprise a first and a second operation switch. The first operation switch may be operated for raising the piece of furniture, and the second operation switch may be operated to lower the piece of furniture. The power control unit may further comprise a first and a second relay, each in direct electrical connection with an operation switch respectively. The operation of the electric motor may thereby be controlled by the first operation switch via the first relay, or by the second operation switch via the second relay, wherein the relays supply power to the electric motor.

In another embodiment, the relay in the activated state may be adapted to provide power and a motor operating signal to a control unit in the height adjustable piece of furniture, wherein the motor operation signal may be adapted to control in which direction an electric motor in the height adjustable piece of furniture is to be operated.

The direction in which the electric motor is intended to be operated may depend on the motor operation signal. The motor operation signal may be based on input from the operation switch. In one embodiment the power control unit is adapted to be connected to two operation switches. Each of the operation switches may indicate a direction in which the electric motor in the piece of furniture is intended to be operated. Depending on which of the two connected operation switches is activated, the power control unit may provide a motor operation signal to a control unit corresponding to a certain direction of the electric motor.

In a further embodiment, the first relay may be prevented from being in the activated state when the second relay is in the activated state.

When an operating switch is activated, the relay may activate power supply to the electric motor. Each of the two operating switches may be activated for a specific operation control of the electric motor. Such control may be an operation direction of the electric motor. The first and the second operating switch may thereby not be activated simultaneously. To prevent the possibility of activating the operation commands for both operation switches simultaneously, the relays may be prevented from being activated simultaneously. When the first operation switch is activated, it may be adapted to both activate the first relay, and at the same time deactivate the second relay. In an alternative embodiment, the first and second relay may be possible to activate simultaneously. Such function may be used to reset the control unit. The two operation switches may thereby be activated simultaneously, which activates both the relays. The control unit may be needed to be reset when any error has occurred, or when a maximum and/or minimum height of the piece of furniture is to be reset.

In one embodiment, the connection between the power source and the height adjustable piece of furniture, when the relay is in the active state, may be provided via the relay.

When the relay is in the deactivated state, the power supply to the piece of furniture may be disconnected. No power may thereby be consumed by the power control unit or the devices connected to the power control unit.

In a further embodiment, the power control unit may comprise the at least one operation switch.

Thereby, the power control unit may be easier to install in an existing piece of piece of furniture. The power control unit does only need to be connected to an electric motor in the piece of furniture. The connection to the electric motor may be via a control unit in the piece of furniture.

According to a third aspect of the invention, a power control unit for a height adjustable piece of furniture comprising at least one adjustable column is provided. The power control unit is adapted to be connected to a power source, and an electric motor of the height adjustable piece of furniture for driving the adjustable column. The power control unit comprises a slideable carrier comprising a power switch. The power switch is in an activated state adapted to provide a connection between the power source and the height adjustable piece of furniture, and in a deactivated state adapted to disconnect the power source from the height adjustable piece of furniture. The power switch is in the activated state when the slideable carrier is in a first slide position and in the deactivated state when the slideable carrier is in a second slide position.

Thereby, a physical interaction from the user, by setting the slideable carrier in the activated state, may enable power to the piece of furniture. The piece of furniture may for instance be a table. The slideable carrier may thereby be arranged at an under surface of a table top of the table. The carrier may thereby be slid from a first position to a second position, which may represent an activated position and a deactivated position. The power switch in the carrier may be arranged such that it is activated, i.e. connects the power source to the piece of furniture, when the carrier is in the activated position. An operation switch for operating the electric motor may be arranged on the carrier. The carrier may be slided from under the table top for a user to reach the operation switch for operation of the electric motor. At the same time as the operation switch becomes operable, the power to the piece of furniture may be activated. This provides a piece of height adjustable furniture to which no power may be supplied when it is in a stand-by mode, i.e. when the slideable carrier is in the second, deactivated, position. The power control unit according to this aspect of the invention may be easy to install on an existing piece of furniture. The power control unit may be connected to the electric motor of the piece of furniture and arranged onto the piece of furniture. The piece of furniture may comprise at least one operation switch for operation of the electric motor. Such operation switch may be arranged onto the slideable carrier. A user may slide the carrier to the first position to activate the power to the piece of furniture, and may thereafter operate the electric motor. When the user has operated the electric motor in the piece of furniture, he/she may move the carrier back to the second position, breaking the power supply to the piece of furniture. In one embodiment, the slideable carrier may comprise spring means, adapted to hold the carrier in the second position as a rest position. The rest position may thereby be a stand-by position which disconnects the power supply to the piece of furniture and provides a zero stand-by power consumption. The power switch may be a circuit breaker.

BRIEF DESCRIPTION OF THE DRAWINGS

The invention will in the following be described in more detail with reference to the enclosed drawings, wherein.

DESCRIPTION OF EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1:
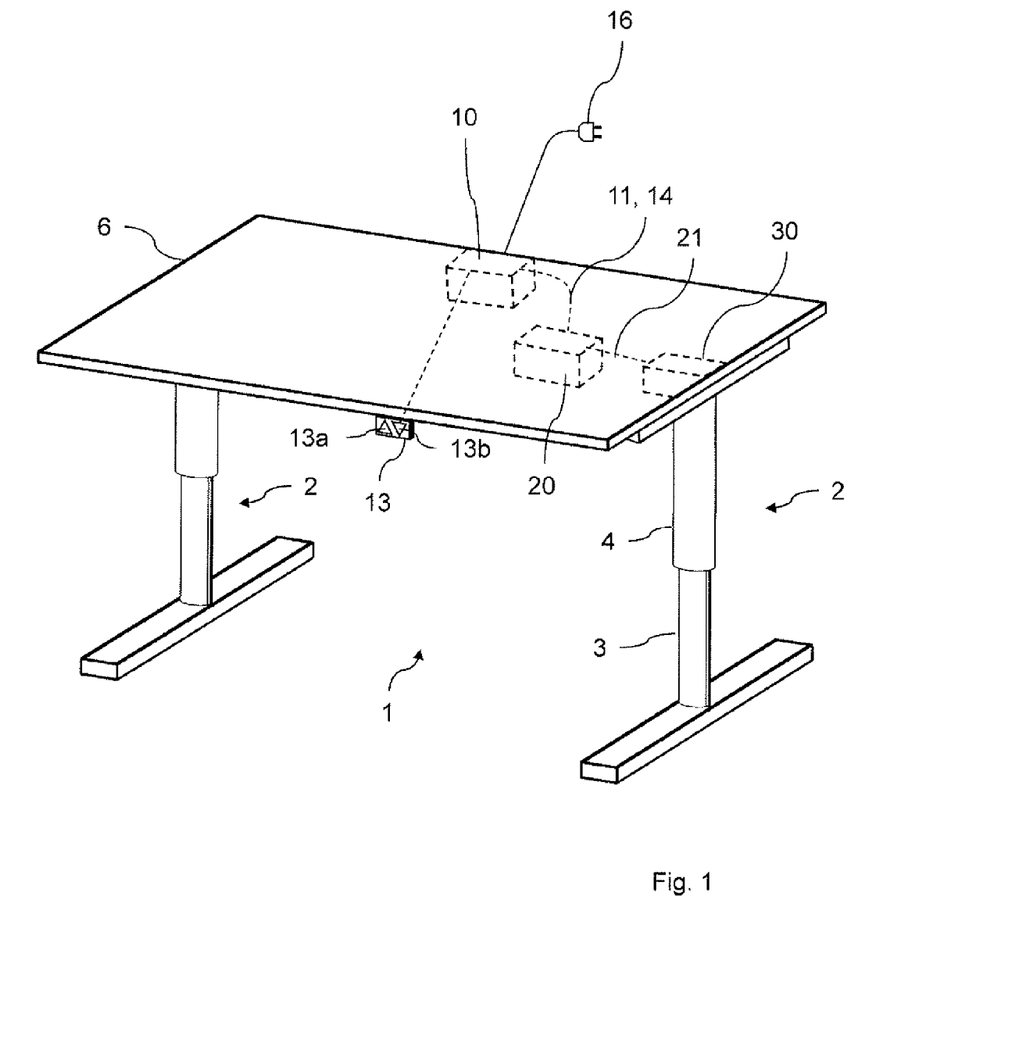
FIG. 1 shows a perspective view of a height adjustable piece of furniture according to an embodiment of the invention.

FIG. 1 illustrates a height adjustable table 1 comprising two extendable columns 2 and a table top 6. Each column 2 comprises of an outer tube 4 and an inner tube 3 adapted for telescopic movement relative to each other. The extension and contraction of a column 2 is operated by an electric motor 30. The column 2 comprises a linear actuator (not shown) which is driven by the electric motor 30. A user of the table 1 can operate the height adjustment by means of an operation unit 13. The operation unit 13 comprises two buttons 13a, 13b. One button 13a is operated for raising the table 1, and the other one 13b is operated for lowering the table 1. The table 1 is powered via a power plug 16 which may be connected to a mains power network.

Figure 3:
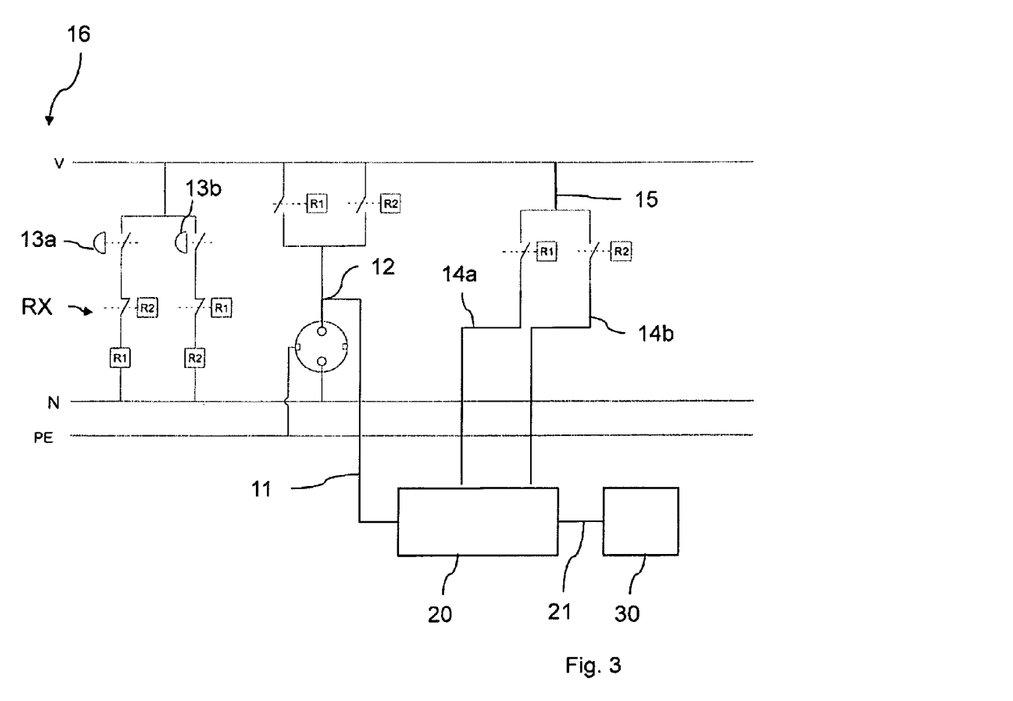
FIG. 3 shows a schematic block diagram of a height adjustable piece of furniture according to an embodiment of the invention.

The power plug 16 is connected to a power control unit 10. The power control unit 10 controls the power distribution in the table 1. The power control unit 10 comprises two relays R1, R2 (FIG. 3). The relays R1, R2 are in direct electrical contact with the buttons 13a, 13b in the operation unit 13. When a button 13a is pressed, one of the relays R1 is activated. The power to the electric motor 30 is then connected and distributed along with an operation signal 14 for the electric motor 30.

The table 1 further comprises a control unit 20 which is in connection with the electric motor 30. The control unit 20 activates and controls the operation of the electric motor 30 in the sense of power, speed and direction of the motor 30. The control unit 20 receives a power signal 11 from the power control unit 10 when a button 13a, 13b is pressed. The control unit 20 further receives the operation signal 14 which indicates which button 13a, 13b that were pressed, i.e. indicated which direction the electric motor 30 should be operated.

Figure 2:
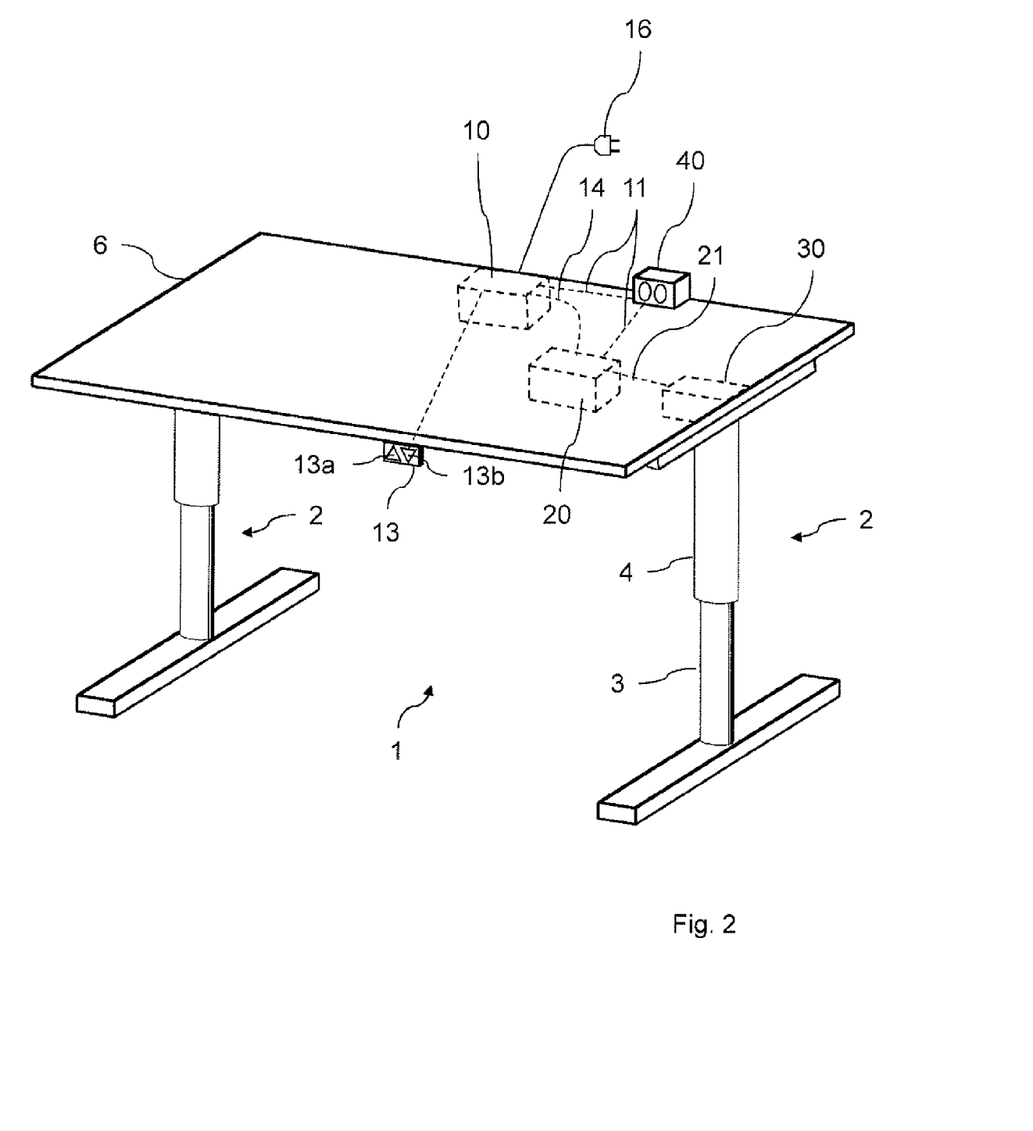
FIG. 2 shows a perspective view of a height adjustable piece of furniture according to an embodiment of the invention.

FIG. 2 illustrates an alternative embodiment wherein the power signal 11 to the control unit 20 is sent from the power control unit 10 via a power box 40. The power box 40 enables power to be used to additional devices via power sockets in the power box 40. The power in the power sockets may be activated at the same time as the power is distributed to the control unit 20 and electric motor 30. Alternatively the power sockets in the power box 40 may always be powered. In the latter case, the power signal from the power control unit 10 to the power box may comprise two separate power signals, one always powering the power sockets, and one which powers the control unit 20 and electric motor 30 as a response to buttons 13a, 13b being pressed.

FIG. 3 illustrates a circuit diagram for the power control circuit in the table 1. The button 13a is connected to the relay R1 and the button 13b is connected to relay R2. When relay R1 is activated, the connection between button 13b and relay R2 is disconnected, as illustrated at marking RX. Further, when relay R2 is activated, the connection between button 13a and relay R1 is disconnected. This prevents the relays R1 and R2 to be activated at the same time. In an alternative embodiment, the relays R1, R2 may be possible to be activated simultaneously, thereby enabling for instance a reset operation by pressing the two buttons 13a, 13b simultaneously. Such reset operation may be needed when the piece of furniture 1 comprises two or more electric motors 30 which need to be synchronized through a reset operation.

When the button 13a is pressed, relay R1 is activated. When relay R1 is activated power from the power supply 16 (V) is connected to an operation power distribution 12 in the power control unit 10. The operation power distribution 12 supplies power to the control unit 20 via connection 11. The control unit 20 uses the power to operate the electric motor 30 via the connection 21. Further when the relay R1 is activated, a first operation signal 14a is sent to the control unit 20. The first operation signal 14a indicates to the control unit 20 that the electric motor 30 should be operated in a first direction, providing the table 1 to be raised, i.e. extending the extendable column 2. If relay R2 is activated instead of R1, by button 13b, the control unit 20 and electric motor 30 are powered in the same way, but a second operation signal 14b is sent to the control unit 20. The second operation signal 14b indicates to the control unit 20 that the electric motor should be operated in a second direction, providing the table 1 to be lowered, i.e. contracting the extendable column 2.

The connection 15 provides an operation signal basis that is common for the two operations signals 14a, 14b. The control unit 20 has different inputs to receive the operation signals 14a, 14b and thereby interpret which operation signal is received.

The power control unit 10 and the control unit 20 may in one embodiment be combined into one unit. Such unit may thereby receive a power supply input, and comprise connections to an operation unit 13 and an electric motor 30.

Figure 4A:
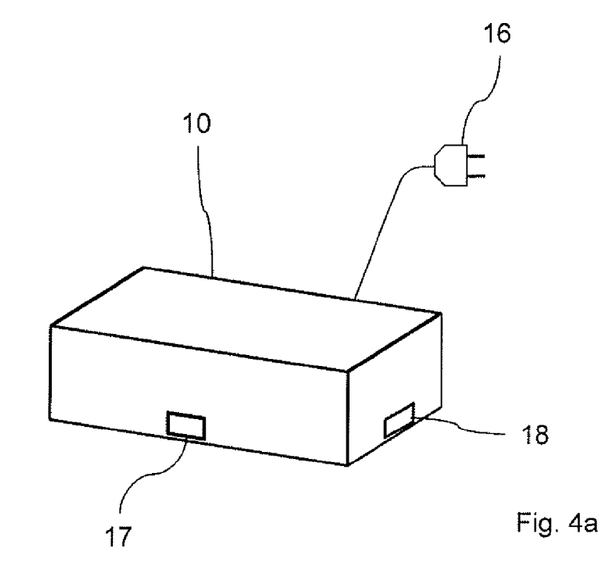
FIG. 4a shows a perspective view of a power control unit according to an embodiment of the invention.

FIG. 4a illustrates a power control unit 10 according to an embodiment of the invention. The power control unit 10 comprises a power supply connection 16. It further comprises an operation unit connection port 17 and a control unit connection port 18. The operation unit connection port 17 is adapted to be a connection to an operation unit 13 of a height adjustable table 1. The control unit connection port 18 is adapted to be a connection to a control unit 20 of a height adjustable table 1. Such power control unit 10 could be installed in an existing height adjustable table. The advantageous function of the power control unit 10, eliminating the stand-by power of the height adjustable table, may thereby be provided in an old table that previously had stand-by power consumption.

Figure 4B:
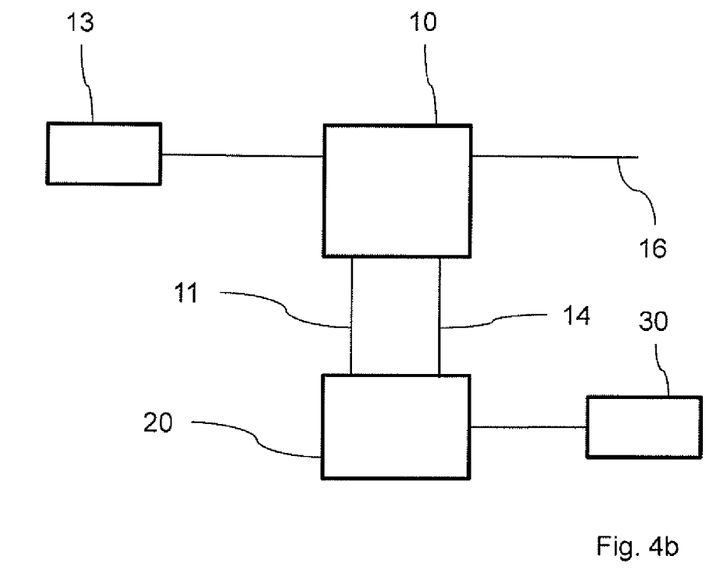
FIG. 4b shows a schematic block diagram of a power control unit installation according to an embodiment of the invention.

As seen in FIG. 4b, the power control unit 10 is inserted between the operation unit 13 and the control unit 20. The power control unit 10 receives a power supply 16. The power control unit 10 is connected to the operation unit 13 via the operation unit connection port 17. The power control unit 10 is further connected to the control unit 20 via the control unit connection port 18. The connection between the power control unit 10 and the control unit 20 comprises two parts, the power supply 11 and the operation signal 14. The control unit 20 is further connected to the electric motor 30 for operation thereof. The control unit 20 may combine the power supply 11 with the operation signal 14 to operate the electric motor 30 in a desired way. When installed in an existing table, a previous direct power supply to the control unit 20 is replaced by the power supply via the power control unit 10. Further, a previous direct connection between the operation unit 13 and the control unit 20 is replaced by a connection via the power control unit 10. Thereby the power distribution function of the power control unit 10 may be used in the table.

In one alternative embodiment, is an operation unit 13 integrated into the power control unit 10. When installed in an existing piece of furniture, the power control unit 10 is only needed to be connected to the control unit 20 for providing power 11 and a motor operation signal 14.

Figure 5:
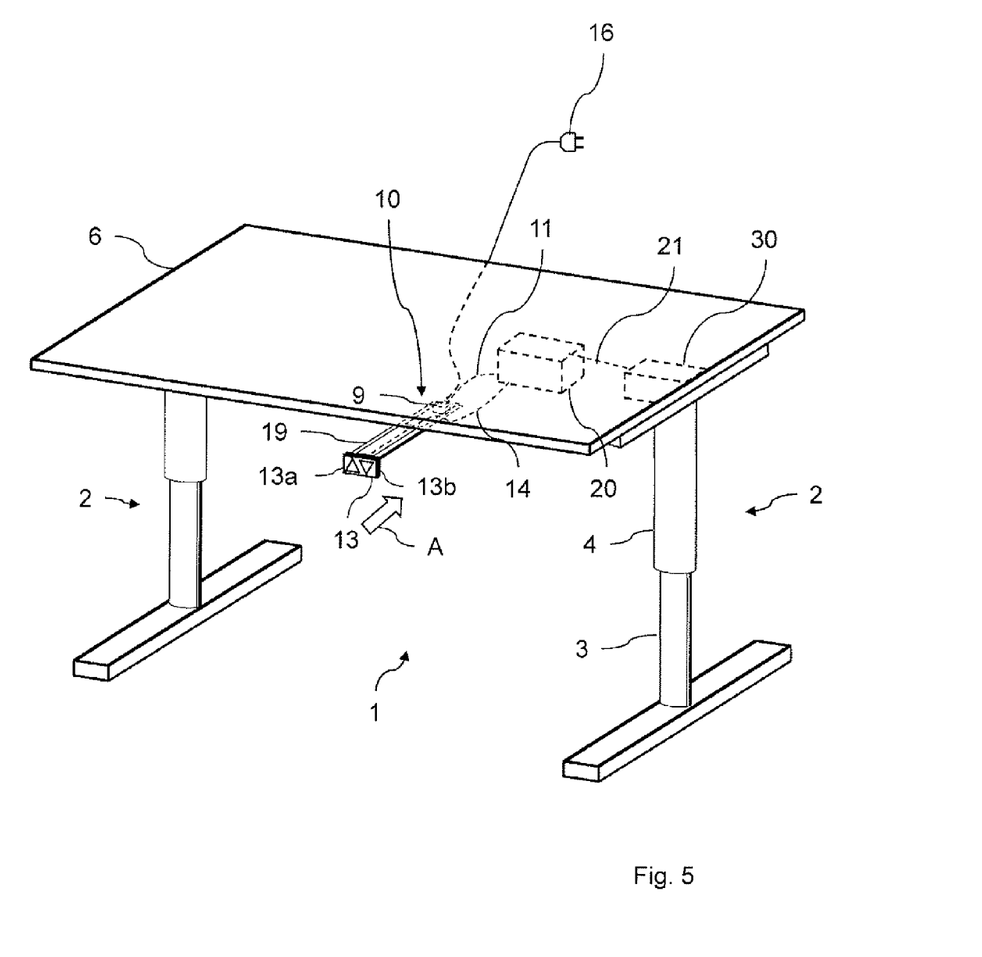
FIG. 5 shows a perspective view of a height adjustable piece of furniture according to an embodiment of the invention.

FIG. 5 illustrates a height adjustable table 1 wherein the power control unit 10 comprises a slideable carrier 19 onto which the operation unit 13 is arranged. The slideable carrier 19 is arranged on an under surface of the table top 6 such that it can be slided from a first position (shown in the figure) to a second position (not shown) wherein the carrier is moved in a direction A towards the table top 6. The power control unit 10 further comprises a power switch 9 arranged on or in connection with the slideable carrier 19. The power switch 9 may be a circuit breaker or the like. The power switch 9 receives power from the power plug 16. The power switch 9 is adapted to supply power to the control unit 20 when in an activated state, and to disconnect power supply to the control unit 20 when in a deactivated state. The power switch 9 is adapted to be in the activated state when the slideable carrier 19 is in the first position, and to be in the deactivated state when the slideable carrier 19 is in the second position. When the power switch 9 is in the activated state it connects power supply to the piece of furniture, i.e. the control unit 20, via the connection 11. The motor operation signal 14 is supplied to the control unit 20 from the operation unit 13.

A user can move the carrier 19 in the direction A to close the power switch 9 and thereby connect power supply to the control unit 20. The user can then operate the electric motor 30 by means of the operation unit 13 arranged on the slideable carrier 19.

Alternatively, the direction A may be in the opposite direction of the direction shown in FIG. 5. The slideable carrier 19 may then be pulled by a user to close the power switch 9.

The slideable carrier 19 can in one embodiment comprise a spring which forces the slideable carrier 9 to the second position, i.e. the deactivated position. The deactivated position thereby becomes a resting position of the slideable carrier 19. A user then needs to, to activate the power supply to the control unit 20, move the carrier 19 in a direction opposite of the spring force direction.

The slideable carrier 19 may be smaller than the one illustrated in FIG. 5.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A height adjustable piece of furniture comprising,
at least one extendable column,
an electric motor adapted for driving the extendable column,
at least one switch for operation control of the electric motor, and
a power control unit adapted to control the power distribution to the height adjustable piece of furniture, and wherein the power control unit is connected to a power source,
wherein:
the connection between the power source and the height adjustable piece of furniture is provided via the switch,
the switch in an activated state is adapted to connect the power source to the height adjustable piece of furniture, and in a deactivated state is adapted to disconnect the power source from the height adjustable piece of furniture,
the switch includes an operation switch and a relay in direct electrical connection with the operation switch,
the connection between the power source and the height adjustable piece of furniture is provided via the relay,
the operation switch in an activated state is adapted to set the relay in an activated state, and
the power supply to the electric motor and to the power control unit is connected via the relay when the relay is in the activated state.

2. The height adjustable piece of furniture according to claim 1, wherein the switch includes two operation switches having a first operation switch for operating the electric motor to expand the extendable column, and a second operation switch for operating the electric motor to contract the extendable column, and
wherein the switch further includes a first and a second relay, each in direct electrical connection with an operation switch respectively.

3. The height adjustable piece of furniture according to claim 2, wherein a first relay is prevented from being in the activated state when the second relay is in the activated state.

4. The height adjustable piece of furniture according to claim 1, wherein the height adjustable piece of furniture further comprises a control unit in connection with the electric motor,
wherein the control unit is powered when the switch is in the activated state, and
wherein the control unit receives a motor operation signal from the switch when the switch is in the activated state.

5. The height adjustable piece of furniture according to claim 1, wherein the switch comprises at least one operation switch arranged on a slideable carrier on the piece of furniture,
wherein the slideable carrier in an activated state is adapted to connect the power source to the height adjustable piece of furniture, and in a deactivated state is adapted to disconnect the power source from the height adjustable piece of furniture,
wherein the slideable carrier includes a power switch for connection or disconnection of the power source to the height adjustable furniture,
wherein slideable carrier in a first slide position is in the activated state wherein the power switch is adapted to connect the power source to the height adjustable furniture, and
wherein the slideable carrier in a second slide position is in the deactivated state wherein the power switch is adapted to disconnected the power source from the height adjustable furniture.

6. A power control unit for a height adjustable piece of furniture having at least one adjustable column, wherein the power control unit is adapted to be connected to:
a power source,
an electric motor of the height adjustable piece of furniture for driving the at least one adjustable column, and
at least one operation switch adapted for control of the operation of the electric motor,
the power control unit comprising:
a relay adapted for direct electrical connection with the at least one operation switch and wherein the at least one operation switch is adapted to, when activated, activate the relay,
wherein the relay in an activated state is adapted to provide a connection between the power source and the electric motor, and in a deactivated state is adapted to disconnect the power source from the electric motor, and
wherein the power source to the electric motor and to the power control unit is connected via the relay when the relay is in the activated state.

7. The power control unit according to claim 6, wherein the power control unit is adapted to be connected to a first operation switch and a second operation switch for control of operation of the electric motor, and wherein the power control unit includes a first relay and a second relay, each in direct electrical connection with the first and second operation switches, respectively.

8. The power control unit according to claim 6, wherein the relay in the activated state is adapted to provide power and a motor operating signal to a control unit in the height adjustable piece of furniture, wherein the motor operation signal is adapted to control in which direction an electric motor in the height adjustable piece of furniture is to be operated.

9. The power control unit according to claim 7, wherein the first relay is prevented from being in the activated state when the second relay is in the activated state.

10. The power control unit according to claim 6, wherein the connection between the power source and the height adjustable piece of furniture, when the relay is in the active state, is provided via the relay.

11. A power control unit for a height adjustable piece of furniture comprising at least one adjustable column, wherein the power control unit is adapted to be connected to:
- a power source,
- an electric motor of the height adjustable piece of furniture for driving the adjustable column, and
- at least one operation switch adapted for control of the operation of the electric motor, the power control unit comprising:
- a relay adapted for direct electrical connection with the at least one operation switch and wherein the at least one operation switch is adapted to, when activated, activate the relay,
- wherein the relay in an activated state is adapted to provide a connection between the power source and the electric motor, and in a deactivated state is adapted to disconnect the power source from the electric motor, and
- a slideable carrier including a power switch,
- wherein the power switch in an activated state is adapted to provide a connection between the power source and the relay, and in a deactivated state is adapted to disconnect the power source from the relay, and
- wherein the power switch is in the activated state when the slideable carrier is in a first slide position, and in the deactivated state when the slideable carrier is in a second slide position, and
- wherein the power source to the electric motor and to the power control unit is connected via the relay when the relay is in the activated state.

* * * * *